(12) United States Patent
Metten et al.

(10) Patent No.: US 7,608,005 B2
(45) Date of Patent: Oct. 27, 2009

(54) PLANET CARRIER

(75) Inventors: Norbert Metten, Aurachtal (DE);
Ramon Jurjanz, Herzogenaurach (DE);
Thorsten Biermann, Muehlhausen (DE)

(73) Assignee: Schaeffler KG, Herzogenaurach (DE)

( * ) Notice: Subject to any disclaimer, the term of this patent is extended or adjusted under 35 U.S.C. 154(b) by 281 days.

(21) Appl. No.: 11/556,799

(22) Filed: Nov. 6, 2006

(65) Prior Publication Data

US 2007/0111846 A1  May 17, 2007

(30) Foreign Application Priority Data

Nov. 12, 2005  (DE) .................. 10 2005 054 084

(51) Int. Cl.
*F16H 57/04* (2006.01)
(52) U.S. Cl. .................. 475/159; 475/331; 184/6.12
(58) Field of Classification Search ............ 475/159, 475/160, 331, 348; 184/6.12
See application file for complete search history.

(56) References Cited

U.S. PATENT DOCUMENTS

| 2,408,336 | A |  | 9/1946 | Palmer Orr |  |
|---|---|---|---|---|---|
| 2,518,837 | A |  | 8/1950 | Taylor |  |
| 2,681,126 | A |  | 6/1954 | Searls |  |
| 4,222,290 | A |  | 9/1980 | Helmer et al. |  |
| 5,643,126 | A | * | 7/1997 | Hotta et al. ................. | 475/159 |
| 5,702,320 | A | * | 12/1997 | Brassai et al. ............... | 475/159 |
| 5,910,063 | A |  | 6/1999 | Kato |  |
| 6,832,974 | B2 | * | 12/2004 | Kakamu et al. ............. | 475/331 |
| 7,097,582 | B2 | * | 8/2006 | Bauknecht et al. .......... | 475/159 |
| 2006/0160654 | A1 | * | 7/2006 | Tiesler et al. ............... | 475/331 |

FOREIGN PATENT DOCUMENTS

| DE | 44 18 693 |  | 3/1995 |
| DE | 195 34 791 | AD | 3/1997 |
| DE | 197 36 686 | A | 3/1998 |
| DE | 102 21 097 | Y | 11/2003 |
| DE | 103 09 666 | Y | 12/2004 |
| EP | 0 738 843 | A | 10/1996 |
| EP | 07 38 843 | X | 10/1996 |
| EP | 1319871 |  | 6/2003 |
| JP | 61 038249 | A | 2/1986 |
| JP | 06 058381 | A | 3/1994 |
| JP | 06 124857 | A | 5/1994 |
| JP | 07 208587 | A | 8/1995 |
| WO | WO01/44695 | A | 6/2001 |
| WO | 03095870 | A | 11/2003 |

\* cited by examiner

*Primary Examiner*—Roger L Pang
*Assistant Examiner*—Erin D Bishop
(74) *Attorney, Agent, or Firm*—Lucas & Mercanti, LLP

(57) ABSTRACT

The invention relates to a planet carrier (1) with planet pins (2) that are supported in at least one wall section (10) of the planet carrier (1), the planet carrier (1) having at least one axial bearing (6) supported on the wall section (10), with the axial bearing (6) being supported on the wall section (10) by means of at least one axial disc (9), the planet carrier (1) furthermore having at least one lubricating oil feed (11) overlapping the planet pins (2) to the planet pins (2), with the lubricating oil feed (11) having at least one oil retaining disc (13, 22) located on the planet carrier (1) and thus overlapping the lubrication openings (12) to the hollow planet pins (2).

11 Claims, 3 Drawing Sheets

PLANET CARRIER

FIELD OF THE INVENTION

The invention relates to a planet carrier with planet pins that are supported in at least one wall section of the planet carrier, the planet carrier having at least one axial bearing supported on the wall section, with the axial bearing being supported on the wall section by at least one axial disc, the planet carrier further having at least one lubricating oil feed to the planet pins that overlaps the planet wheel pins, with the lubricating oil feed having at least one oil retaining disc located on the planet carrier and thus overlapping openings to the hollow planet pins.

BACKGROUND OF THE INVENTION

A planet carrier of this kind is described in more detail in DE 195 34 791 A1. The wall section is usually embodied on the hub component of the planet carrier or on other components of the planet carrier on which an axial bearing in the form of an axial roller or needle bearing is supported. The lubricating oil feed carries and guides the lubricating oil radially outwards by centrifugal force. The lubricating oil thrown outwards backs up mainly in front of axially aligned openings at correspondingly hollow planet pins. The oil flows through the openings via the lubricating channels in the pin to the bearings of the planet wheels.

Because the openings of the hollow planets are usually axially aligned, these are barely accessible for the required relatively large amount of lubricating oil. Therefore, an oil retaining plate is provided against which the largest possible amount of lubricating oil impacts and that guides the oil flow radially outwards. The oil retaining plate then collects and backs up the oil radially inwards in front of the openings so that an adequate quantity of lubricating oil is present in front of the holes and this then reaches the planet bearings due to the pressure build-up.

DE 195 34 791 A1 describes an oil retaining disc in the form of an axial disc of the axial bearing. This oil retaining disc is located with the axial bearing on the planet carrier and furthermore overlaps the openings to the hollow planet pins. A guide section on the axial disc extends radially inwards to collect the oil and pass it radially outwards to the planet pins.

The axial disc of the lubricating oil feed or of the axial bearing according to DE 195 34 791 A1 lies partially at the back against a wall section of the planet carrier. Between the back sections of the axial disc that do not lie against the wall section and the end face of the planet pins, gaps are, according to DE 195 34 791 A1, formed between the axial disc and the axial opening of the respective planet pin. With the aid of the axial disc, oil is backed up in the gaps in front of the opening because the axial disc lies radially against the opening and against the gap forming a seal against the wall section of the planet carrier. The axial disc thus overlaps the planet pin and the lubrication openings.

An axial roller track on which the roller bodies of the axial bearing run is formed on the axial disc. At the points at which the gap between the pin and the axial disc is formed at the back of the axial disc the axial roller track is not adequately supported axially, particularly when the bearing is under heavy load.

When travelling radially from inside to outside, the oil is also supposed to flow through the axial bearing. However, in the lubricating oil feed according to DE 195 34 791 A1 a large part of the oil is retained by the guide section of the axial disc and is thus not available for lubrication of the axial bearing.

Because of the conical shape of the guide section, the axial disc is relatively large and is expensive to manufacture.

SUMMARY OF THE INVENTION

The object of the invention is therefore to provide a planet carrier that is improved with respect to the lubrication of the axial bearing and with respect to the planet bearing.

This object is achieved according to the subject matter of Claim 1 and further dependent claims.

The invention relates to all types of planet carriers in which any number of planet pins with planet wheels are received. The wall sections of the planet carrier, of sheet metal or cast material, have receptacles in which the planet gears are supported. The axial disc on which the axial bearing is supported is part of the lubricating oil feed to the planet pins.

The lubricating oil feed is a unit consisting of at least one axial disc and at least one oil retaining disc. The oil retaining disc overlaps the openings to the hollow planet pins. According to the invention, the oil retaining disc is partially arranged axially between the axial disc and the wall section of the planet carrier in such a way that the axial disc overlaps the oil retaining disc in a radial direction from inside to outside.

The lubricant, for example, emerging radially inwards from a lubricating oil opening of a hollow gear shaft, is squirted radially outwards and/or is thrown radially outwards by centrifugal force, flows radially outwards along the axial disc and thus first passes the axial bearing. The oil is then guided past the overlap onto the oil retaining disc and is finally collected and backed up in front of the lubrication openings to the planet pins by means of the oil retaining disc.

Because the axial disc partially overlaps the oil retaining disc in the radial direction from inside to outside, the oil flows unrestricted and without loss of lubricating oil past the overlap onto the oil retaining disc. The axial bearing lies directly in the undivided lubricating oil stream that is intercepted by the oil retaining disc and is therefore adequately supplied. The oil retaining disc has an oil collecting groove running radially outwards in an adjacent manner to the openings. The oil collecting groove is limited radially outwards and axially in both directions by the material of the oil retaining disc and is open radially inwards to the axis of rotation of the planet carrier.

A further advantage of the invention results when, as provided by an embodiment of the invention, the oil retaining disc is held on the wall section at least by means of the axial disc. The oil retaining disc is therefore axially gripped between the axial disc and the section of the planet carrier on which the axial bearing is supported and thus held in position after adequate centring. Additional securing means such as rivets or similar are omitted.

It is useful to provide either the planet carrier or the axial disc with centring projections such as a centring collar. The oil retaining disc is positioned, centred or guided on the centring collar in such a way that the lubrication openings are accessible to the collected oil.

A further embodiment of the invention provides that the axial disc is supported at least on the back of the roller load-bearing zone of the axial roller track on the wall section. The maximum load-bearing capacity of the axial roller bearing is thus ensured. To this end, an embodiment of the invention provides that the axial disc first projects radially outwards from the wall section in an adjacent manner to the annular-disc shaped axial track. The disc is shaped towards the radial direction from the section with the roller track away from the wall section of the planet carrier so that said disc appears cropped when viewed in the lengthwise direction. This produces an annular gap radially outwards towards the axial roller track between the annular section and the wall section. The oil retaining disc dips at least partially radially into the annular gap and there it is centred and/or gripped against the section of the axial disc.

A further embodiment of the invention provides that axial oil conductors project from the oil retaining disc. The shell or tube-shaped hollow cylindrical oil conductors project from the section of the oil retaining disc in which an oil backup in front of the lubrication openings of the planet pins is to be expected during operation. Preferably, the oil conductors project radially into the hollow planet pins. The shell-shaped oil conductors are a section in the form of a segment that results, for example, when a hollow cylinder is halved along the symmetrical axis.

A further embodiment of the invention provides that the oil retaining disc is centred and/or located on the wall section by means of the oil conductors. For this purpose, the oil retaining disc is preferably pushed, pressed or clipped into the lubrication opening to the planet pin and/or hollow planet pin. The oil conductors are either secured to the oil retaining disc or the oil retaining disc and oil conductors are formed as a single part. As an option, the oil retaining disc has openings to the hollow planet pins. From each of the axial openings a lubrication channel extends through the oil conductors into the respective planet pin.

The preferred material for the manufacture of the oil retaining disc and/or oil conductors is plastic, steel or non-ferrous metals and their alloys. The axial disc and the oil retaining disc can be manufactured as separate parts and are therefore cost effective.

A further embodiment of the invention refers to the attachment of the axial disc to the planet carrier. It is provided that the axial disc is secured as a form fit with a disc to the wall section. The disc is, for example, a further axial disc for a further axial bearing that lies against the side of the wall section facing away from the oil retaining disc. At least one of the two discs projects with at least one axial projection in through a central through passage on the wall section in the direction of the opposite side and engages through it. The axial discs are thus secured together as a form fit by means of the projection or projections.

BRIEF DESCRIPTION OF THE DRAWINGS

The invention is explained in more detail in the following with the aid of exemplary embodiments. The drawings are as follows.

DETAILED DESCRIPTION OF THE DRAWINGS

Figure 1:
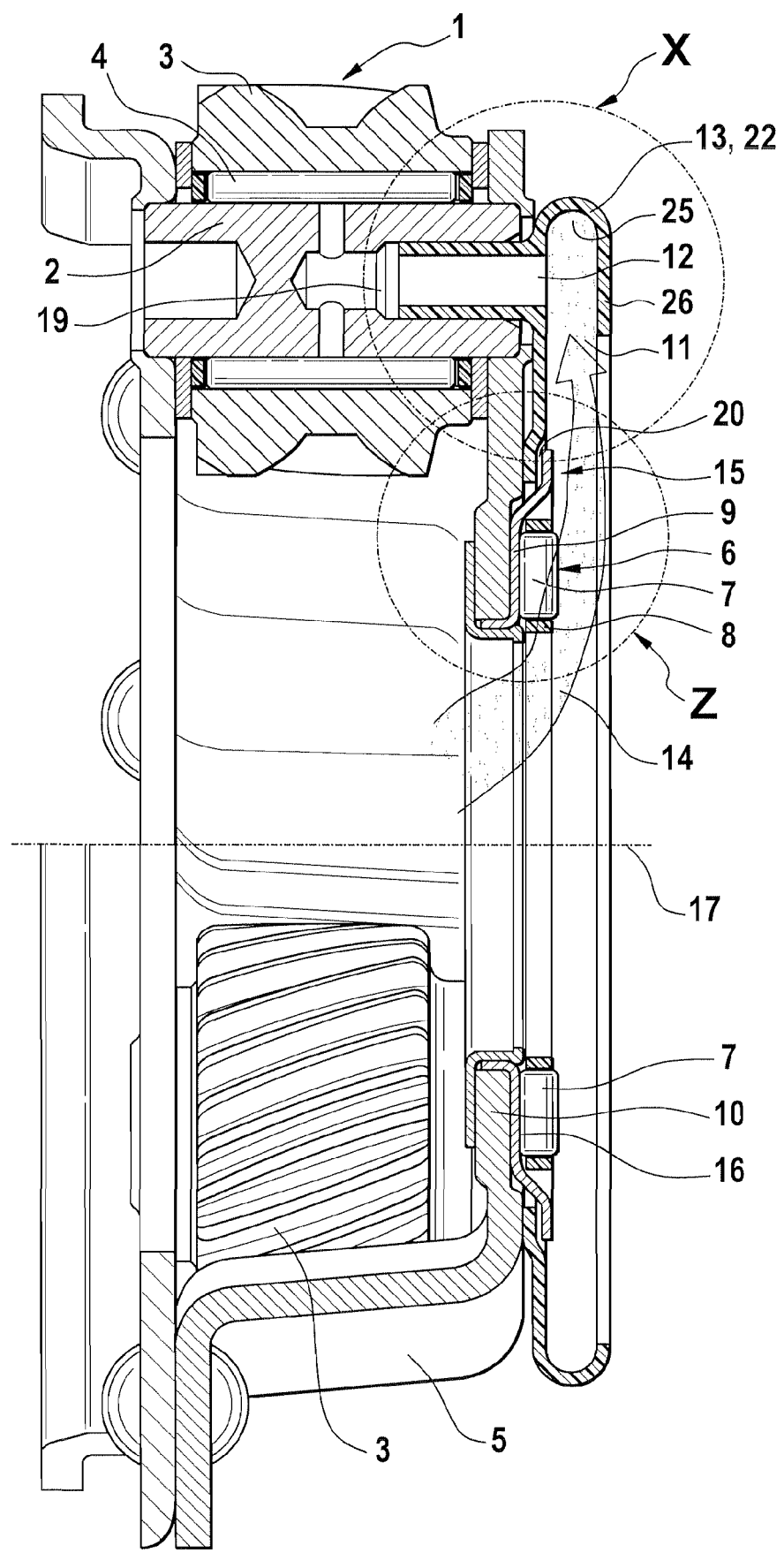
FIG. 1 A lengthwise section along the axis of rotation of the planet gear of a planet carrier.

FIG. 1 shows a planet carrier 1 with planet pins 2. Planet wheels 3 are mounted on the planet pins 2 by means of roller bearings 4 in the form of needle-roller bearings. The planet pins 2 are supported in a wall section 10 of a housing 5 of the planet carrier 1 to withstand the stresses acting on the planet wheels 3.

Figure 3:
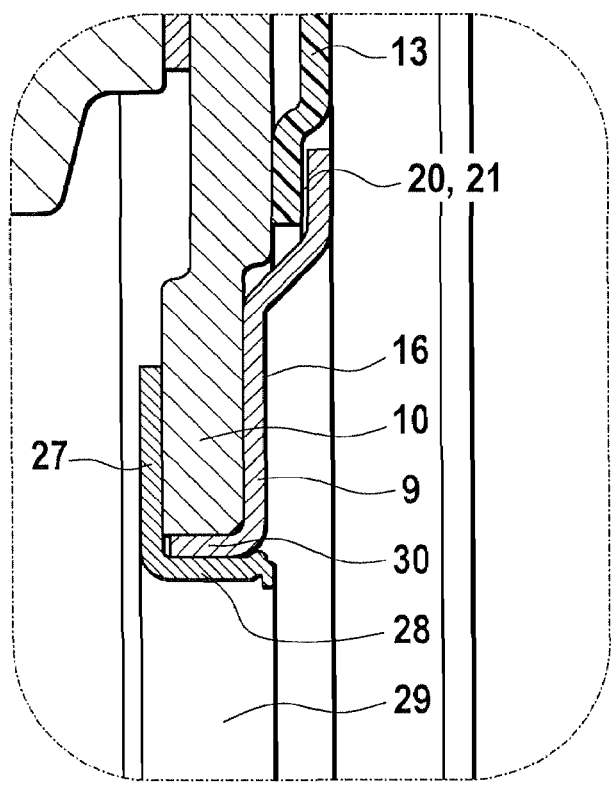
FIG. 3 Detail Z from the view of the planet carrier in FIG. 1, shown enlarged and not to scale.

An axial roller bearing 6, in the form of a needle-roller bearing with needles 7 in a cage 8, is axially supported on the planet carrier 1. The axial bearing 6 has an axial disc 9 with an axial roller track 16 that is supported on the back on a wall section 10 of the housing 5. As shown in FIG. 3, the axial disc 9 projects radially outwards from the wall section 10 in an adjacent manner to the annular disc-shaped axial roller track 16, so that an annular gap 20 is formed radially in an adjacent manner to the annular disc-shaped track between the wall section 10 and the axial disc 9.

The planet carrier 1 has a lubricating oil feed 11 to the planet pins 2 that axially overlaps the lubrication openings 12 to the hollow planet pins 2. The lubricating oil feed 11 is formed by the axial disc 9 and an oil retaining disc 13 or 22 that is located on the planet carrier 1 and thus overlaps lubrication openings 12 to hollow planet pins 2.

Figure 2:
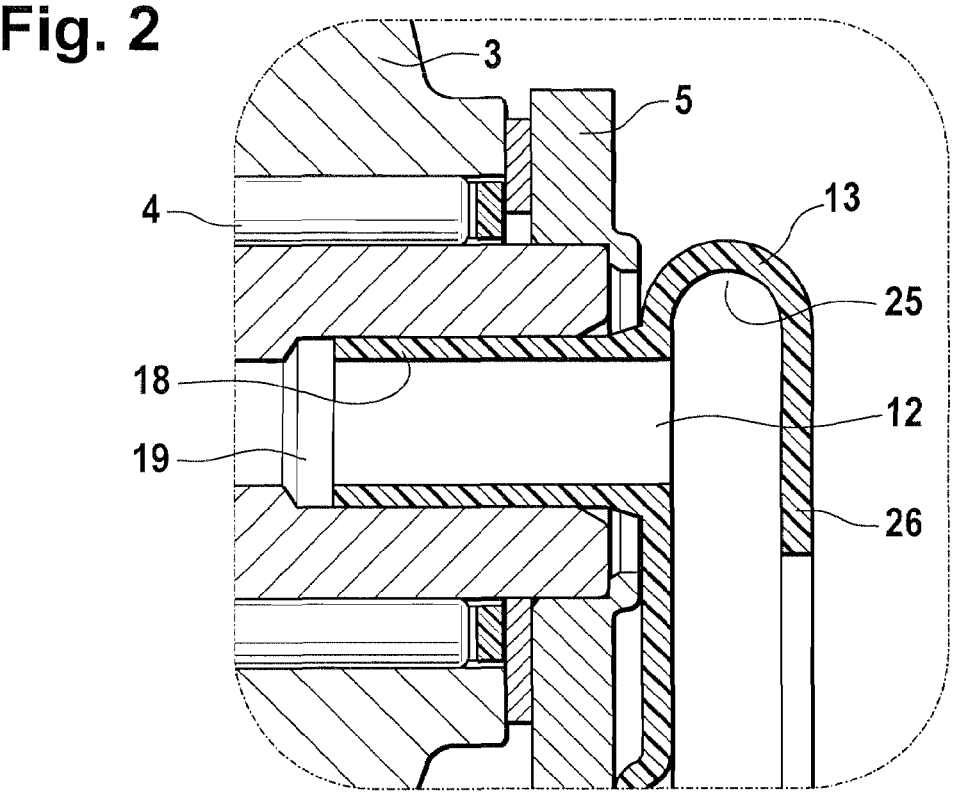
FIG. 2 Detail X from the view of the planet carrier in FIG. 1, shown enlarged and not to scale.

As can be seen from FIG. 3, the oil retaining disc 13 dips at least partially radially into the annular gap 20 with end play 21. Oil conductors 18 project axially from the oil retaining disc 13. The oil retaining disc 13 and the hollow cylindrical oil conductors 18 are shown in FIG. 2 as a single part made of plastic. The oil retaining disc 13 has the lubrication openings 12 to the hollow planet pins 2. A lubricating channel 19 extends from each of the axial lubrication openings 12 into the respective planet pin 2.

FIG. 2 shows that the oil retaining disc 13 is centred and located on the wall section 10 relative to the axis of rotation 17 by means of the oil conductors 18. For this purpose, the oil conductors 18 are, for example, pressed axially into the lubrication channels 19 of the planet pins 2.

Figure 4:
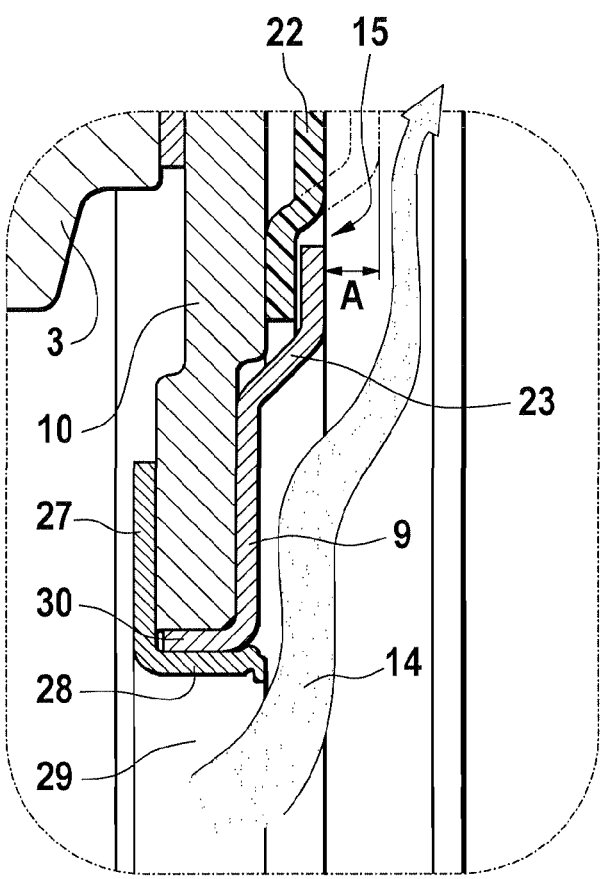
FIG. 4 A modification of detail Z with respect to detail Z from the view in FIG. 3.

As in FIG. 4 that shows a detail Z of the oil retaining disc 22, the oil retaining disc 22 is centred on the projection 23 by means of the axial disc 9 and is axially gripped between the axial disc 9 and the wall section 10 and thus located on the planet carrier 1. The oil retaining disc 22 is arranged with an annular section axially between the axial disc 9 and the wall section 10 in such a way that the axial disc 9 partially overlaps the oil retaining disc 22 in a radial direction from inside to outside. The oil flow 14 shown with the double arrow first flows through the axial bearing 6 and then passes the overlap area 15. As shown by the dotted lines, the oil retaining disc 22 can also project axially beyond the overlap area or axial roller track 16 by a distance A.

Figure 5:
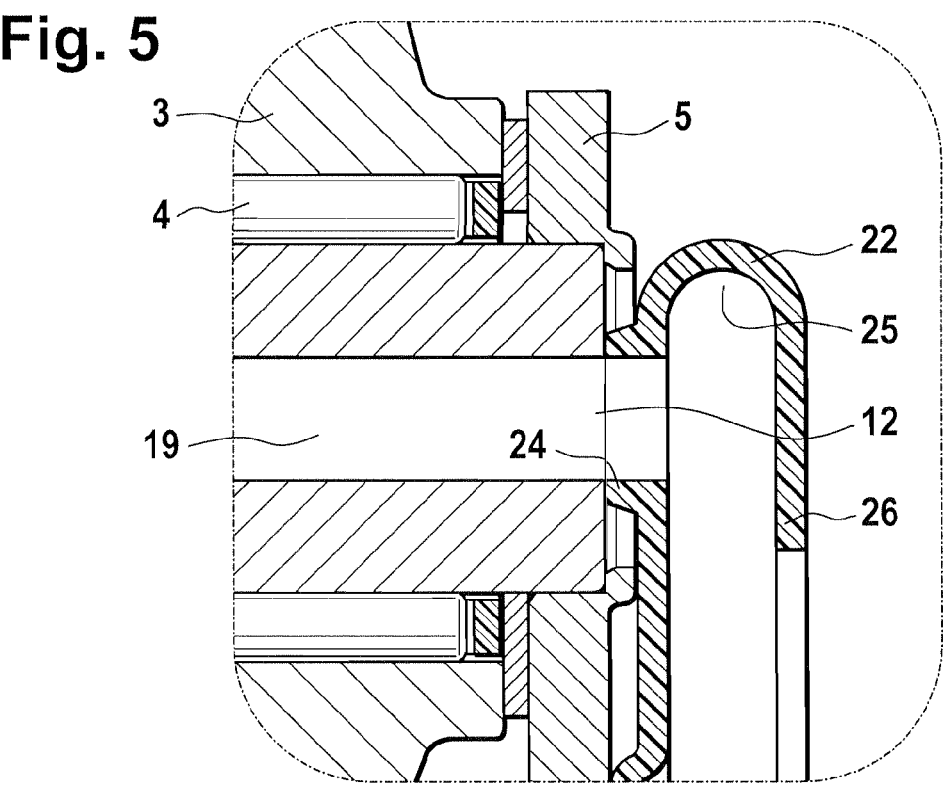
FIG. 5 A modification of detail X with respect to detail X from the view in FIG. 2.

As shown in FIG. 5, the oil retaining disc 22 has stub-type passages 24 that at the end face lie flat on the edge of the lubrication openings 12 of the planet pins 2 and pass into the lubrication channels 19.

The oil retaining disc 13 is arranged with an annular section axially between the axial disc 9 and the wall section 10 in such a way that the axial disc 9 partially radially overlaps the oil retaining disc 13 in a radial direction from inside to outside. The oil flow 14 shown with the double arrow in FIG. 1, first flows through the axial bearing 6 then passes the overlap area 15. Because of the centrifugal forces directed radially away from the axis of rotation 17 of the planet carrier 1 hardly any oil for lubrication is lost at the overlap area 15.

The oil retaining disc 13 or 2 has an oil collecting groove 25 aligned radially outward in an adjacent manner to the openings 12. The oil collecting groove 25 is limited radially outwards and axially in both directions by the material of the oil retaining disc 13 or 22 and is open radially inwards to the axis of rotation 17 of the planet carrier 1.

For this purpose the oil retaining disc 13 or 22 first runs radially in the inside to outside direction. Then at the oil collecting groove 25 the oil retaining disc 13 or 22 is curved back in the direction of the axis of rotation 17 of the planet carrier 1 and finally continues radially in the direction of the axis of rotation 17 of the planet carrier 1 at least until an annular disc section 26 from the material of the oil retaining disc 13 or 22 lies axially opposite the lubrication openings 12.

The axial disc 9 is secured as a form fit with a further axial disc 27 to the wall section 10 (FIG. 3 and FIG. 4). The axial disc 27 lies against the side of the wall section 10 facing away from the oil retaining disc 13 and engages with at least one axial projection 28 in a central through passage 29 on the wall section 10. The axial disc 9 engages via the projection 30 in the through passage 29 and is snapped onto the projection 28 with the axial disc 27.

REFERENCE CHARACTER LIST

1 Planet carrier
2 Planet pin
3 Planet wheel
4 Roller bearing
5 Housing
6 Axial bearing
7 Needles
8 Cage
9 Axial disc
10 Wall section
11 Lubricating oil feed
12 Lubrication openings
13 Oil retaining disc
14 Oil flow
15 Overlap area
16 Axial roller track
17 Axis of rotation
18 Oil conductor
19 Lubrication channel
20 Annular gap
21 End play
22 Oil retaining disc
23 Shoulder
24 Passages
25 Oil collecting groove
26 Annular disc section
27 Axial disc
28 Extension
29 Through passage
30 Extension

The invention claimed is:

1. A planet carrier comprising a housing having at least one wall section with an opening therein; an axial disc mounted in the opening, the axial disc having an annular disc-shaped axial roller track, the track supported by the wall section and an axial roller bearing with roller bodies rolling on the track, wherein the axial disc projects axially outwards from the wall section in an adjacent manner to the annular disc-shaped axial roller track, so that an annular gap is formed axially in an adjacent manner to the annular disc-shaped axial roller track between the wall section and the axial disc, with at least one oil retaining disc dipping at least partially radially into the annular gap.

2. The planet carrier according to claim 1, wherein the oil retaining disc is centered on the axial disc relative to the axis of rotation of the planet carrier.

3. The planet carrier according to claim 1, wherein oil conductors project axially from the oil retaining disc with the oil conductors projecting into the planet pins.

4. The planet carrier according to claim 3, wherein the oil retaining disc is located on the wall section by means of the oil conductors.

5. The planet carrier according to claim 3, wherein the oil retaining disc is centered relative to the axis of rotation of the planet carrier by means of the oil conductors.

6. The planet carrier according to claim 3, wherein the oil conductors are hollow cylinders.

7. The planet carrier according to claim 3, wherein the oil retaining disc and the oil conductors are formed as a single part.

8. The planet carrier according to claim 3, wherein the oil retaining disc has lubrication openings to the planet pins, with a lubrication channel extending from each of the lubrication openings through the oil conductors into the planet pins.

9. The planet carrier according to claim 1, wherein the oil retaining disc has lubrication openings to planet pins with a lubrication channel extending from each of the lubrication openings into the planet pins.

10. The planet carrier according to claim 9, wherein the oil retaining disc first runs radially in the inside to outside direction and then at an oil collecting groove is curved back in the direction of the axis of rotation of the planet carrier and finally continues radially in the direction of the axis of rotation of the planet carrier at least until an annular disc section from the material of the oil retaining disc lies axially opposite the lubrication openings.

11. The planet carrier according to claim 1, wherein the oil retaining disc has an oil collecting groove radially outwards in an adjacent manner to the lubrication openings with the oil collecting groove being limited radially outwards and axially in both directions by the material of the oil retaining disc and being open radially inwards to the axis of rotation of the planet carrier.

* * * * *